Patented Apr. 20, 1937

2,077,903

UNITED STATES PATENT OFFICE 2,077,903

PROCESS OF PREPARING 3-AMINO-QUINOLINES

Hans Schlichenmaier, Kelkheim in Taunus, and Ludwig Schörnig, Frankfort-on-the-Main, Germany, assignors to General Aniline Works, Inc., New York, N. Y., a corporation of Delaware No Drawing. Application December 10, 1934, Serial No. 756,894. In Germany December 15, 1933

7 Claims. (Cl. 260—38)

The present invention relates to a process of preparing 3-amino-quinolines and compounds thus obtained.

We have found that 3-amino-quinolines are obtainable by causing a 3-hydroxy-quinoline such as, for instance, a compound of the following general formula

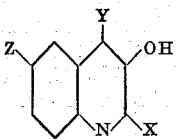

wherein X means alkyl or phenyl, Y hydrogen or carboxyl, Z hydrogen or phenyl, to react with ammonia at raised temperature, for instance, at a temperature between about 150° C. and about 300° C. and under raised pressure, in the presence or absence of a compound capable of accelerating the reaction. According to this process new products are obtainable, for instance, the compound of the formula

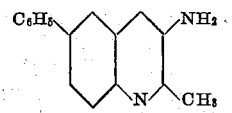

It could not be foreseen that this reaction would be possible since the hydroxy group in the parent material, for instance in 2-methyl-3-hydroxyquinoline, reacts only with difficulty. As is known, it is not possible to exchange such hydroxy group for chlorine with the aid of phosphorous pentachloride or to obtain 2-methyl-3-aminoquinoline from 2-methyl-3-hydroxyquinoline by reaction with zinc-chloride ammonia and ammonium chloride. (Compare Koenigs and Stockhausen, Berichte der deutschen chemischen Gesellschaft, vol. 35, page 2559.)

The 3-hydroxyquinolines may easily be transformed into the corresponding amino-compounds by using instead of zinc-chloride ammonia and ammonium chloride, ammonia at raised temperature and under raised pressure. The reaction is preferably carried out in an iron pressure vessel provided with a stirrer. In order to facilitate the reaction ammonium sulfite, for instance, may be added. When as parent material a 3-hydroxyquinoline-4-carboxylic acid is used, carbon-dioxide is split off during the exchange of the hydroxy group for the amino group.

Since derivatives of 3-hydroxyquinoline are easily obtainable, the new process for preparing 3-amino-quinolines from the hydroxy compounds constitutes a technical progress since, hitherto, these bases have been accessible only by complicated and laborious methods.

The derivatives of 3-amino-quinolines which are obtainable according to the present process and in part have not been described hitherto are suitable for use in the preparation of dyestuffs and pharmaceutical products.

The following examples serve to illustrate the invention, but they are not intended to limit it thereto; the parts are by weight:

(1) 150 parts of 2-methyl-3-hydroxyquinoline are heated at 220° C. to 225° C. for 25 hours together with 3000 parts of concentrated aqueous solution of ammonia in a pressure vessel, while stirring; the pressure rises to about 75 atmospheres above atmospheric pressure. On cooling, the 2-methyl-3-aminoquinoline formed separates from the solution in the form of yellowish-brown small crystals. It is recrystallized from water and then forms light-yellow long needles which melt at 159° C. to 160° C. Its properties correspond with those of the 2-methyl-3-amino-quinoline described in the literature.

(2) 240 parts of 2-methyl-3-hydroxyquinoline are heated at 180° C. for 35 hours together with 750 parts of ammonium sulfite and 3000 parts of concentrated aqueous ammonia solution in a pressure vessel, while stirring; the pressure rises to about 40 atmospheres above atmospheric pressure. After cooling, the brown reaction mass is filtered with suction, the 2-methyl-3-aminoquinoline remaining on the filter as a dark residue. It is boiled with about 4000 parts of water and the hot solution is filtered. On cooling the filtrate, the 2-methyl-3-amino-quinoline is obtained in the form of light-yellow long needles, melting at 159° C. to 160° C. The resinous residue, insoluble in boiling water, yields on repeated extracting with hot water a further quantity of 2-methyl-3-amino-quinoline.

(3) 500 parts of 2-methyl-3-hydroxyquinoline-4-carboxylic acid [compare S. Berlingozzi and G. B. Capuano (Atti della Reale Accademia dei Lincei Roma, 33 II 92)] are heated at 220° C. to 225° C. for 30 hours with 3000 parts of concentrated aqueous ammonia solution in a pressure vessel, while stirring. Carbondioxide is split off and the pressure rises, temporarily, to about 90 atmospheres above atmospheric pressure.

The brown mass obtained is filtered with suction after cooling and the dark solid residue is extracted by boiling with water. The 2-methyl-3-amino-quinoline obtained separates from the filtrate in the form of long needles, melting at 160° C.

(4) 90 parts of 2-methyl-3-hydroxy-6-phenyl-quinoline-4-carboxylic acid are heated at 210° C. for 40 hours together with 2000 parts of concentrated aqueous ammonia solution in a pressure vessel, while stirring. After cooling, the dark yellow reaction mass is filtered with suction. The brownish residue obtained, partially crystallized, is triturated with concentrated hydrochloric acid to form a thin paste. It is filtered with suction, the crude hydrochloride of 2-methyl-3-amino-6-phenyl-quinoline remaining on the filter as a yellow residue. It is purified by dissolving it in boiling water and filtering the hot solution. On cooling, the hydrochloride of the base separates from the solution in the form of light-yellow crystals, melting at 290° to 295° C. The base itself is easily precipitated as a colorless precipitate from the aqueous solution of the hydrochloride by means of dilute ammonia. It is very sparingly soluble in hot water, but rather readily soluble in hot alcohol. On cooling the hot solution, the 2-methyl-3-amino-6-phenylquinoline is obtained in the form of colorless small crystals melting at 217° C. to 218° C.

The 2-methyl-3-hydroxy-6-phenylquinoline-4-carboxylic acid used as starting material in this example may be obtained in the following manner:

18 parts of water and 0.132 part of quicklime are stirred together until a thin milk of lime is obtained. While well stirring, a solution of 0.132 part of 5-phenyl-isatin in 1.2 parts of dioxane and 1 part of alcohol is added and the whole is heated to 80° C. When the formation of the calcium salt of 5-phenyl-isatin acid is finished, 0.12 part of chloracetone are added, drop by drop, within 1 to 2 hours and the whole is stirred for 4 to 5 hours at 80° C. to 90° C. The whole is then allowed to cool and is rendered acid to Congo paper by means of concentrated hydrochloric acid. The light-yellow paste of 6-phenyl-3-hydroxy-2-methyl-4-quinoline carboxylic acid is filtered with suction and washed free from salt with the aid of water. After drying, the yield of 6-phenyl-3-hydroxy-2-methyl-4-quinoline carboxylic acid obtained is: 0.155 part, whereas the calculated yield amounts to 0.163 part. In order to purify the carboxylic acid, it may be dissolved in sodium carbonate solution and, after filtration, precipitated by means of hydrochloric acid. The yield of purified acid is 0.15 part=92%, calculated upon the 5-phenyl-isatin used. The 2-methyl-3-hydroxy-6-phenyl-quinoline-4-carboxylic acid forms a yellow powder which melts at 246° C. while vigorously frothing ($CO_2$), then solidifies again and finally melts once more at 270° C. to 277° C. In hot sodium carbonate solution the carboxylic acid is easily soluble. On heating in nitrobenzene, the carboxylic group is split off and 6-phenyl-3-hydroxy-2-methylquinoline is obtained.

(5) 235 parts of 2-phenyl-3-hydroxyquinoline are heated at 200° C. to 210° C. for 25 hours together with 5000 parts of concentrated ammonia in a pressure vessel provided with a stirrer; the pressure rises to about 60 atmospheres above atmospheric pressure. After cooling, the reaction product forms a solid yellowish mass which is dried and distilled under reduced pressure. The 2-phenyl-3-aminoquinoline boils under a mercury pressure of about 3 mm. at 223° C. to 225° C. and solidifies at once in the receiver to a yellowish crystalline magma. After recrystallization from a suitable solvent, for instance, hexahydrobenzene, the base melts at about 120° C. to 121° C. The solutions of the salts show a strong greenish fluorescence.

(6) 20 parts of 2-methyl-3-hydroxy-quinoline-4-carboxylic acid are heated at 200° C. for about 15 to 20 hours together with 150 parts of anhydrous ammonia in a pressure vessel; the pressure rises to about 173 atmospheres above atmospheric pressure. The reaction product forms a dark colored solid mass; it is heated to boiling with about 500 parts of water. A small quantity of a dark resin remains undissolved. On cooling, the 2-methyl-3-aminoquinoline separates from the filtrate in the form of nearly colorless needles.

We claim:
1. The process which comprises heating for several hours a 3-hydroxy-quinoline with ammonia in a closed pressure vessel.
2. The process which comprises heating at a temperature of between about 150° C. and about 300° C. for several hours a 3-hydroxy-quinoline with ammonia in a closed pressure vessel.
3. The process which comprises heating at a temperature of about 180° C. to about 225° C. for several hours a quinoline compound of the general formula

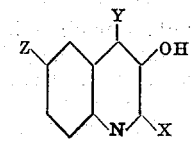

wherein X is a member of the group consisting of alkyl and phenyl, Y is a member of the group consisting of hydrogen and carboxyl, Z is a member of the group consisting of hydrogen and phenyl, with ammonia in a closed pressure vessel.
4. The process which comprises heating at a temperature of about 200° C. to about 225° C. for several hours 2-methyl-3-hydroxyquinoline-4-carboxylic acid with ammonia in a closed pressure vessel.
5. The process which comprises heating at a temperature of about 200° C. for about 15 to 20 hours 2-methyl-3-hydroxy-quinoline-4-carboxylic acid with anhydrous ammonia in a closed pressure vessel.
6. The process which comprises heating at a temperature of about 210° C. for about 40 hours 2-methyl-3-hydroxy-6-phenyl-quinoline-4-carboxylic acid with a concentrated solution of ammonia in water in a closed pressure vessel.
7. The process which comprises heating at a temperature of about 200° C. to 210° C. for about 25 hours 2-phenyl-3-hydroxy-quinoline with a concentrated solution of ammonia in water in a closed pressure vessel.

HANS SCHLICHENMAIER.
LUDWIG SCHÖRNIG.